US012322016B2

(12) United States Patent
Chae et al.

(10) Patent No.: US 12,322,016 B2
(45) Date of Patent: *Jun. 3, 2025

(54) APPARATUS AND METHOD FOR GENERATING SPEECH SYNTHESIS IMAGE

(71) Applicant: DEEPBRAIN AI INC., Seoul (KR)

(72) Inventors: Gyeong Su Chae, Seoul (KR); Guem Buel Hwang, Seoul (KR)

(73) Assignee: DEEPBRAIN AI INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/779,651

(22) PCT Filed: Mar. 15, 2022

(86) PCT No.: PCT/KR2022/003607
§ 371 (c)(1),
(2) Date: May 25, 2022

(87) PCT Pub. No.: WO2023/153553
PCT Pub. Date: Aug. 17, 2023

(65) Prior Publication Data
US 2024/0412439 A1  Dec. 12, 2024

(30) Foreign Application Priority Data
Feb. 9, 2022 (KR) .......... 10-2022-0017213

(51) Int. Cl.
*G06T 13/40* (2011.01)
*G06T 7/246* (2017.01)
(Continued)

(52) U.S. Cl.
CPC ............. *G06T 13/40* (2013.01); *G06T 7/246* (2017.01); *G06T 7/262* (2017.01); *G06T 11/206* (2013.01);
(Continued)

(58) Field of Classification Search
None
See application file for complete search history.

(56) References Cited

U.S. PATENT DOCUMENTS 10,438,410 B2 * 10/2019 Kim .............. G02B 27/0093
2020/0342634 A1    10/2020 Barnes et al.
(Continued)

FOREIGN PATENT DOCUMENTS

CN        111797682 A     10/2020
KR   10-2016-004157 A      4/2016
(Continued)

OTHER PUBLICATIONS

Huang, et al., "Beyond Face Rotation: Global and Local Perception GAN for Photorealistic and Identity Preserving Frontal View Synthesis", IEEE International Conference on Computer Vision, 2017, pp. 1-11 (Year: 2017).*

(Continued)

*Primary Examiner* — Saptarshi Mazumder
(74) *Attorney, Agent, or Firm* — The PL Law Group, PLLC

(57) ABSTRACT

An apparatus for generating a speech synthesis image according to a disclosed embodiment is an apparatus for generating a speech synthesis image based on machine learning, the apparatus including a first global geometric transformation predictor configured to be trained to receive each of a source image and a target image including the same person, and predict a global geometric transformation for a global motion of the person between the source image and the target image based on the source image and the target image, a local feature tensor predictor configured to be trained to predict a feature tensor for a local motion of the person based on preset input data, and an image generator configured to be trained to reconstruct the target image based on the global geometric transformation, the source image, and the feature tensor for the local motion.

12 Claims, 5 Drawing Sheets

100

(51) Int. Cl.
G06T 7/262 (2017.01)
G06T 11/20 (2006.01)
G06T 13/20 (2011.01)
G10L 15/02 (2006.01)

(52) U.S. Cl.
CPC ............ G06T 13/205 (2013.01); G10L 15/02 (2013.01); *G06T 2207/20076* (2013.01); *G06T 2207/30201* (2013.01)

(56) References Cited

U.S. PATENT DOCUMENTS

2020/0393943 A1　12/2020　Sowden et al.
2023/0111633 A1*　4/2023　Paruchuri ............... G06T 13/40
　　　　　　　　　　　　　　　　　705/26.7

FOREIGN PATENT DOCUMENTS

KR　　10-2020-0145700 A　　12/2020
WO　　　WO 02/31772 A2　　4/2002

OTHER PUBLICATIONS

M. Wang et al.,"Facial Expression Synthesisusing a Global-Local Multilinear Framework", Computer Graphics Forum, Jul. 13, 2020, vol. 39, No. 2, pp. 235-245.
Lijuan Wang et al., 'High Quality Lip-Sync Animation for 3D Photo-Realistic Talking Head', ICASSP 2012, Mar. 2012.See the entire document.

* cited by examiner

APPARATUS AND METHOD FOR GENERATING SPEECH SYNTHESIS IMAGE

CROSS REFERENCE TO RELATED APPLICATIONS AND CLAIM OF PRIORITY

This application claims benefit under 35 U.S.C. 119, 120, 121, or 365 (c), and is a National Stage entry from International Application No. PCT/KR2022/003607, filed Mar. 15, 2022, which claims priority to the benefit of Korean Patent Application No. 10-2022-0017213 filed in the Korean Intellectual Property Office on Feb. 9, 2022, the entire contents of which are incorporated herein by reference.

BACKGROUND

1. Technical Field

Embodiments of the present disclosure relate to a technology for generating a speech synthesis image.

2. Background Art

When the difference in the position, posture, and shape of the same object (or the same type of object) in a pair of images (or moving image frames) containing the object is defined as a "motion", tasks such as image conversion, moving image synthesis, and feature point detection may be performed by separating and estimating the motion from the identity of the object.

The tasks may be performed through machine learning models. In this case, in training the general machine learning model, one image is used as a source and the other image is used as a target, among a pair of images containing the same object, and when the source is input to the machine learning model, the machine learning model transforms the input source into a target and outputs it. Then, the difference between the result output from the machine learning model and a correct answer value (actual target) is defined as an error or loss function, and training is performed to reduce the error or loss function.

Meanwhile, as one method of estimating a motion, there is a method using a geometric transformation such as an affine transformation. In this case, one geometric transformation may be defined as a specific combination of element transformations required to express the motion of an object. For example, the affine transformation is a combination of element transformations such as parallel translation, rotation, scaling, and tilt. In this case, the element transformation may vary depending on the content intended to express or limit the motion, and the space in which the geometric transformation is performed may be two-dimensional, three-dimensional, or any other dimension.

In the method of estimating a motion through geometric transformation in a machine learning model, a sufficient number of geometric transformations have to be used in parallel for accurate motion estimation of an object, which is a problem that the volume of the machine learning model increases and a lot of calculations are required.

SUMMARY

Embodiments disclosed herein are to provide a new technique for generating a speech synthesis image.

An apparatus for generating a speech synthesis image according to an embodiment disclosed herein is an apparatus for generating a speech synthesis image based on machine learning, and the apparatus includes: a first global geometric transformation predictor configured to be trained to receive each of a source image and a target image including the same person, and predict a global geometric transformation for a global motion of the person between the source image and the target image based on the source image and the target image; a local feature tensor predictor configured to be trained to predict a feature tensor for a local motion of the person based on preset input data; and an image generator configured to be trained to reconstruct the target image based on the global geometric transformation, the source image, and the feature tensor for the local motion.

The global motion may be a motion of the person with an amount greater than or equal to a preset threshold amount of motion, and the local motion may be a motion of a face when the person is speaking.

The first global geometric transformation predictor may be further configured to extract a geometric transformation into a source image heat map from a preset reference probability distribution based on the source image, extract a geometric transformation into a target image heat map from the preset reference probability distribution based on the target image, and calculate the global geometric transformation based on the geometric transformation into the source image heat map from the reference probability distribution and the geometric transformation into the target image heat map from the reference probability distribution.

The source image heat map may be a probability distribution map in an image space as to whether each pixel in the source image is a pixel related to the global motion of the person, and the target image heat map may be a probability distribution map in the image space as to whether each pixel in the target image is a pixel related to the global motion of the person.

The local feature tensor predictor may include a first local feature tensor predictor configured to be trained to predict a speech feature tensor for a local speech motion of the person based on a preset voice signal, and the local speech motion may be a motion related to speech of the person.

The local feature tensor predictor may further include a second local feature tensor predictor configured to be trained to predict a non-speech feature tensor for a local non-speech motion of the person based on preset input data, and the local non-speech motion may be a motion not related to speech of the person.

The second local feature tensor predictor may be trained to receive a target partial image including only a motion not related to speech of the person in the target image, and predict the non-speech feature tensor based on the target partial image.

The apparatus may further include an optical flow predictor configured to be trained to calculate an optical flow between the source image and the target image based on the source image and the global geometric transformation, and the image generator may be trained to reconstruct the target image based on the optical flow between the source image and the target image, the source image, and the feature tensor for the local motion.

The first global geometric transformation predictor may be further configured to calculate a geometric transformation into any i-th (i∈{1, 2, . . . , n}) (n is a natural number equal to or greater than 2) frame heat map in an image having n frames from a preset reference probability distribution when the image is input, and calculate a global geometric transformation between two adjacent frames in the image based on the geometric transformation into the i-th frame heat map from the reference probability distribution.

The apparatus for generating a speech synthesis image may further include a second global geometric transformation predictor configured to receive sequential voice signals corresponding to the n frames, and to be trained to predict a global geometric transformation between two adjacent frames in the image from the sequential voice signals.

The second global geometric transformation predictor may be further configured to adjust a parameter of an artificial neural network to minimize a difference between the global geometric transformation between the two adjacent frames which is predicted in the second global geometric transformation predictor and the global geometric transformation between the two adjacent frames which is calculated in the first global geometric transformation predictor.

In a test process for speech synthesis image generation, the second global geometric transformation predictor may be further configured to receive sequential voice signals of a predetermined person, calculate a global geometric transformation between two adjacent frames in an image corresponding to the sequential voice signals from the sequential voice signals, and calculate a global geometric transformation between a preset target frame and a preset start frame based on the global geometric transformation between the two adjacent frames, the local feature tensor predictor may be further configured to predict a feature tensor for a local motion of the person based on preset input data, and the image generator may be further configured to reconstruct the target frame based on the global geometric transformation, the source image, and the feature tensor for the local motion.

A method for generating a speech synthesis image according to an embodiment disclosed herein is a method for generating a speech synthesis image based on machine learning that is performed in a computing device including one or more processors and a memory storing one or more programs executed by the one or more processors, and the method includes: training a first global geometric transformation predictor to receive each of a source image and a target image including the same person, and predict a global geometric transformation for a global motion of the person between the source image and the target image based on the source image and the target image; training a local feature tensor predictor to predict a feature tensor for a local motion of the person based on preset input data; and training an image generator to reconstruct the target image based on the global geometric transformation, the source image, and the feature tensor for the local motion.

According to the embodiments disclosed herein, the global motion and the local motion of a person in an image are separately estimated at the time of generating a speech synthesis image, thereby making it possible to reduce the overall volume of the machine learning model for generating a speech synthesis image and reduce the number of computations used therefor.

DETAILED DESCRIPTION

Figure 1:
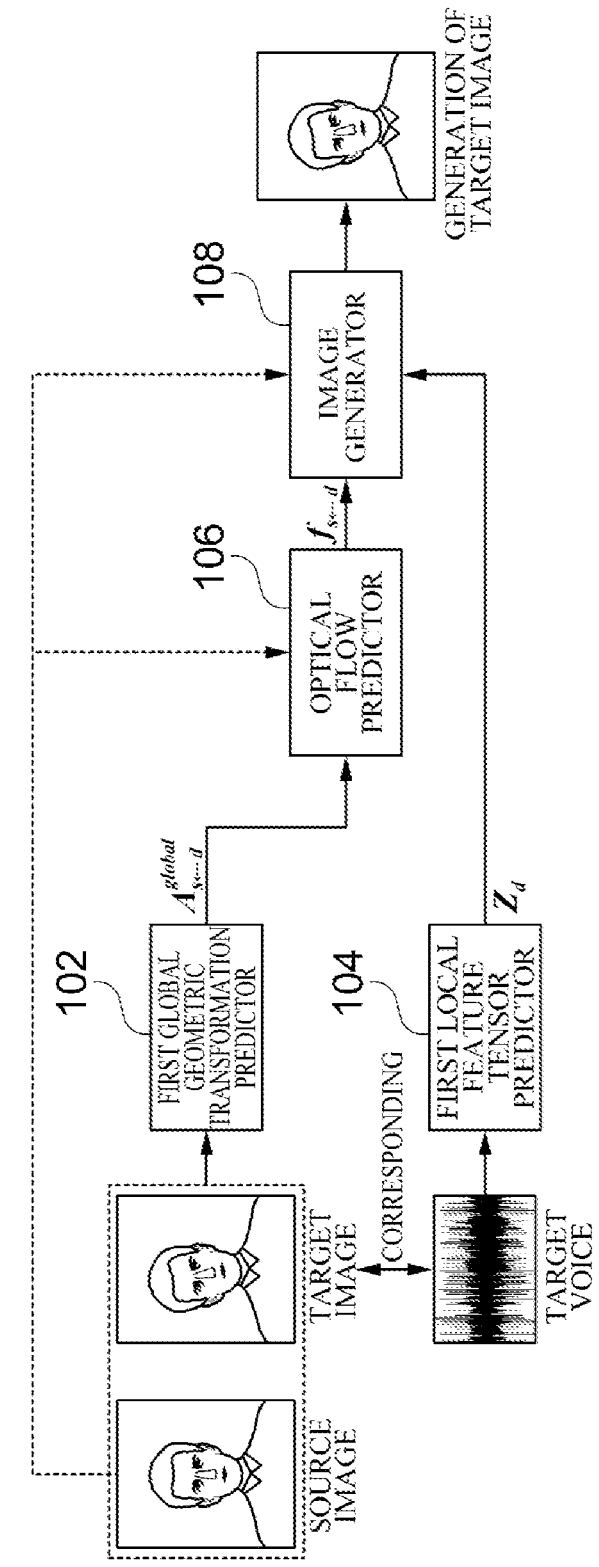
FIG. 1 is a block diagram showing a configuration of an apparatus for generating a speech synthesis image according to an embodiment of the present disclosure.

Hereinafter, specific embodiments of the present disclosure will be described with reference to the accompanying drawings. The following detailed description is provided to assist in a comprehensive understanding of the methods, devices and/or systems described herein. However, the detailed description is only for illustrative purposes and the present disclosure is not limited thereto.

In describing the embodiments of the present disclosure, when it is determined that detailed descriptions of known technology related to the present disclosure may unnecessarily obscure the gist of the present disclosure, the detailed descriptions thereof will be omitted. The terms used below are defined in consideration of functions in the present disclosure, but may be changed depending on the customary practice or the intention of a user or operator. Thus, the definitions should be determined based on the overall content of the present specification. The terms used herein are only for describing the embodiments of the present disclosure, and should not be construed as limitative. Unless expressly used otherwise, a singular form includes a plural form. In the present description, the terms "including", "comprising", "having", and the like are used to indicate certain characteristics, numbers, steps, operations, elements, and a portion or combination thereof, but should not be interpreted to preclude one or more other characteristics, numbers, steps, operations, elements, and a portion or combination thereof.

Further, it will be understood that, although the terms first, second, etc. may be used herein to describe various elements, these elements should not be limited by these terms. These terms may be used to distinguish one element from another element. For example, without departing from the scope of the present disclosure, a first element could be termed a second element, and similarly, a second element could be termed a first element.

In the embodiments disclosed herein, the "speech synthesis image" is an image obtained by synthesizing a speech scene of a person through a machine learning model, and may also be referred to as a lip-sync image. The speech synthesis image may be an upper body image including the head and chest of a person, but is not limited thereto.

In addition, a "global motion" may refer to a large motion of the person in the image in the overall frame. When the speech synthesis image is an upper body image, a global motion may refer to the motion of the entire upper body of the person in the image (e.g., the motion such as changing the posture of the upper body of the person in the image or turning the head of the person in the image). The global motion is a motion with an amount greater than or equal to a preset threshold amount, and the threshold amount may be set to represent a large motion of the person in the overall frame.

In addition, a "local motion" may refer to a facial motion when a person in the image is speaking. That is, the local motion may refer to a change in facial expression, mouth and jaw motions, or the like that appear on the person's face when the person in the image is speaking. The local motion may be a motion with an amount below a threshold amount.

In the embodiments disclosed herein, at the time of generating a speech synthesis image, generation of the global motion of a person in the image may be controlled by performing separation and estimation from the input image using a geometric transformation bottleneck, and generation of the local motion of the person in the image may be controlled using an input speech voice or the like.

Specifically, when the full motion of a specific object in the image consists of a combination of motions of N independent elements, N geometric transformations may be required to fully estimate the full motion. Here, when the motions of the N independent elements are quantitatively different (for example, when the areas or volumes of parts of the object in the image to which the motions are applied are different or the sizes of the motions are different, and so on), the error associated with the motion of each element is proportional to the amount of the motion of the element.

In this case, when the motion of an object is estimated through the machine learning model using K geometric transformations, where K is a number smaller than N (that is, K<N), in a process in which learning about the part with a large error among the motions of the elements is prioritized in the machine learning model, the K geometric transformations are derived to capture the element motion that is the largest.

Therefore, when a bottleneck is formed by limiting the number of geometric transformations and element transformations constituting the geometric transformation, it is possible to separate and estimate the global motion of the person in the image (that is, large motion such as the motion of the head and torso of the person) from the local motion with a relatively small motion size (that is, facial motion when a person is speaking). The global motion may be a motion of a single element having the largest motion size, or may be a set of motions of a plurality of elements having a motion size greater than or equal to a preset size.

In an exemplary embodiment, a single geometric transformation consisting of element transformations such as parallel translation, rotation, and scaling may be used to capture the global motion of a person in an image. Here, the parallel translation may be used to capture the overall movement of the upper body of the person in the image. Rotation and horizontal scaling may be used to capture the changes caused by the rotation of the head of the person in the image. The vertical scaling may be used to capture the vertical length change of the entire head and torso caused by the person in the image raising or lowering his or her head.

For another example, the motion of the head of the person in the image may be captured through a geometric transformation consisting of parallel translation and rotation, and the motion of the torso of the person in the image may be captured through another geometric transformation consisting of only parallel translation.

For another example, when a speech synthesis image includes only the head and the upper part of the neck of the person, the position of the neck is dependent on the head motion, and thus, the motion of the head of the person in the image may be captured using a single geometric transformation consisting of parallel translation and rotation.

Meanwhile, the local motion of the person in the image may be divided into two motions. That is, the local motion may be divided into a motion related to speech (e.g., motions of the mouth (including lips) and jaw of the person) and a motion not related to speech (e.g., blinking of the eyes, eyebrow motion, frown, or the like, of the person). Hereinafter, the motion related to speech among the local motions may be referred to as a local speech motion. The motion not related to speech among the local motions may be referred as a local non-speech motion.

Here, for local speech motion, an artificial neural network that uses the speech voice signal of a person as an input is added to the machine learning model and a feature tensor for the motion related to speech (local speech motion) is output from the added artificial neural network, where the output feature tensor may be used as an input at the time of generating the speech synthesis image.

In this case, the speech voice signal may use speech voice signals corresponding to the source image and the target image, respectively, but is not limited thereto, and may use only the speech voice signal of the target image while omitting the speech voice signal of the source image. The components and number of geometric transformations for predicting local direct motion of the person may be appropriately set as needed.

In addition, for the local non-speech motion, the artificial neural network that uses an image including only motions not related to the speech of the person (for example, image including only the areas around the eyes and eyebrows of the person) (or a feature point showing only the non-speech motion of the person) as an input is added to the machine learning model and a feature tensor for the motion related to non-speech (local non-speech motion) from the added artificial neural network is output, whereby the output feature tensor may be used as an input at the time of generating a speech synthesis image.

FIG. 1 is a block diagram showing a configuration of an apparatus for generating a speech synthesis image (speech synthesis image generating apparatus) according to an embodiment of the present disclosure.

Referring to FIG. 1, a speech synthesis image generating apparatus 100 may include a first global geometric transformation predictor 102, a first local feature tensor predictor 104, an optical flow predictor 106, and an image generator 108. The speech synthesis image generating apparatus 100 may be implemented based on a machine learning technology. Hereinafter, a training process for generating a speech synthesis image will be mainly described.

The first global geometric transformation predictor 102 may receive each of a source image $I_s$ and a target image $I_d$. Here, the source image $I_s$ and the target image $I_d$ are a pair of images including the same person, and the speech synthesis image generating apparatus 100 may include an artificial neural network for generating the target image $I_d$ as the speech synthesis image by using the source image $I_s$ as an input.

The source image $I_s$ and the target image $I_d$ may be a video part of an image (that is, including video and audio) in which a person is speaking. The source image $I_s$ and the target image $I_d$ may be images including the face and upper body of the person, but are not limited thereto.

The first global geometric transformation predictor 102 may calculate a geometric transformation (hereinafter, may be referred to as a global geometric transformation) for a global motion between the source image $I_s$ and the target image Id. That is, the first global geometric transformation predictor 102 may calculate a global geometric transformation capable of expressing a difference in the global motion of the person between the source image $I_s$ and the target image $I_d$ (that is, a large motion such as the motion of the head and torso of the person). Hereinafter, the first global geometric transformation predictor 102 is described as calculating the global geometric transformation into the source image $I_s$ from the target image $I_d$ by way of example, but is not limited thereto, and may also calculate the global geometric transformation into the target image $I_d$ from the source image $I_s$.

Specifically, the first global geometric transformation predictor 102 may receive each of the source image $I_s$ and the target image $I_d$, and may extract heat maps for the source image $I_s$ and the target image $I_d$. That is, the first global geometric transformation predictor 102 may extract a heat map $H_s$ (source image heat map) for the source image $I_s$ from the source image $I_s$. The first global geometric transformation predictor 102 may extract a heat map $H_d$ (target image heat map) for the target image $I_d$ from the target image $I_d$.

In an exemplary embodiment, the first global geometric transformation predictor 102 may be constituted by an artificial neural network based on a convolutional neural network (CNN), but is not limited thereto. The first global geometric transformation predictor 102 may extract each of the source image heat map $H_s$ and the target image heat map $H_d$ through Equation 1 below.

$$H_s = F^{global}(I_s)$$
$$H_d = F^{global}(I_d) \quad \text{(Equation 1)}$$

$F^{global}$: Artificial neural network constituting the first global geometric transformation predictor 102

Here, each of the source image heat map $H_s$ and the target image heat map $H_d$ may be a map represented by a probability distribution in an image space. That is, the source image heat map $H_s$ may be a probability distribution map in the image space as to whether each pixel in the source image $I_s$ is a pixel related to the global motion of the person. The target image heat map $H_d$ may be a probability distribution map in the image space as to whether each pixel in the target image $I_d$ is a pixel related to the global motion of the person. In order to achieve the above, an output end of the first global geometric transformation predictor 102 may include a 2D softmax layer.

The first global geometric transformation predictor 102 may calculate each of a probability mean $\mu_s$ of the source image heat map $H_s$ and a probability mean $\mu_d$ of the target image heat map $H_d$ through Equation 2.

$$\mu_s = \Sigma_z H_s(z) z$$
$$\mu_d = \Sigma_z H_d(z) z \quad \text{(Equation 2)}$$

z: Position value of a pixel in the image space (coordinates)

$H_s(z)$: Probability value of the pixel at a position z in the source image heatmap $H_s$ $H_d(z)$: Probability value of the pixel at a position z in the target image heatmap $H_d$ The first global geometric transformation predictor 102 may calculate a covariance matrix of the source image heat map $H_s$ based on the probability mean $\mu_s$ of the source image heat map $H_s$, and may calculate a covariance matrix of the target image heat map $H_d$ based on the probability mean $\mu_d$ of the target image heat map $H_d$. The first global geometric transformation predictor 102 may calculate a covariance matrix $K_s$ of the source image heat map Hs and a covariance matrix $K_d$ of the target image heat map $H_d$ through Equation 3.

$$K_s = \Sigma_z H_s(z)(z-\mu_s)(z-\mu_s)^T$$
$$K_d = \Sigma_z H_d(z)(z-\mu_d)(z-\mu_d)^T \quad \text{(Equation 3)}$$

T: Transpose matrix

Here, the covariance matrix $K_s$ of the source image heat map $H_s$ and the covariance matrix $K_d$ of the target image heat map $H_d$ may be decomposed as in Equation 4 below through singular value decomposition, respectively.

$$K_s = U_s \Sigma_s V_s$$
$$K_d = U_d \Sigma_d V_d \quad \text{(Equation 4)}$$

$U_s$, $U_d$: Unitary matrices
$\Sigma_s$, $\Sigma_d$: Diagonal matrices
$V_s$, $V_d$: Unitary matrices When the covariance matrix $K_s$ of the image heat map $H_s$ and the covariance matrix $K_d$ of the target image heat map $H_d$ are each m×n matrices, $U_s$ and $U_d$ may be unitary matrices having a size of m×m, $\Sigma_s$ and $\Sigma_d$ may be diagonal matrices having a size of m×n, and $V_s$ and $V_d$ may be unitary matrices having a size of n×n.

The first global geometric transformation predictor 102 may calculate a geometric transformation into the source image heat map $H_s$ from a preset reference probability distribution $H_r$ based on the unitary matrix Us and the diagonal matrix $\Sigma_s$ according to the singular value decomposition of the covariance matrix $K_s$ of the source image heat map $H_s$, and the probability mean $\mu_s$ of the source image heat map $H_s$. Here, the preset reference probability distribution $H_r$ may be a probability distribution in which a probability mean is 0, the covariance matrix is an identity matrix, and the main axis is aligned with an image axis.

The first global geometric transformation predictor 102 may calculate a geometric transformation $A_{s \leftarrow r}^{global}$ into the source image heat map $H_s$ from the preset reference probability distribution $H_r$ through Equation 5 below.

$$A_{s \leftarrow r}^{global} = \left[ U_s \Sigma_s^{\frac{1}{2}}, \mu_s \right] \quad \text{(Equation 5)}$$

Further, the first global geometric transformation predictor 102 may calculate a geometric transformation into the target image heat map $H_d$ from the preset reference probability distribution $H_r$ based on the unitary matrix $U_d$ and the diagonal matrix $\Sigma_d$ according to the singular value decomposition of the covariance matrix $K_d$ of the target image heat map $H_d$, and the probability mean $\mu_d$ of the target image heat map $H_d$. The first global geometric transformation predictor 102 may calculate a geometric transformation $A_{d \leftarrow r}^{global}$ into the target image heat map $H_d$ from the preset reference probability distribution $H_r$ through Equation 6 below.

$$A_{d \leftarrow r}^{global} = \left[ U_d \Sigma_d^{\frac{1}{2}}, \mu_d \right] \quad \text{(Equation 6)}$$

Meanwhile, it has been described here that the artificial neural network of the first global geometric transformation predictor 102 receives the source image $I_s$ and the target image $I_d$ to extract the source image heat map $H_s$ and the target image heat map $H_d$, respectively, and the subsequent process is performed through calculations, but the embodiment is not limited thereto, and the artificial neural network of the first global geometric transformation predictor 102 may receive the source image $I_s$ and the target image $I_d$ to extract the geometric transformation $A_{s \leftarrow r}^{global}$ into the source image heat map $H_s$ from the preset reference probability distribution $H_r$ and the geometric transformation $A_{d \leftarrow r}^{global}$ into the target image heat map $H_d$ from the preset reference probability distribution $H_r$, respectively.

The first global geometric transformation predictor 102 may calculate a global geometric transformation into the source image $I_s$ from the target image $I_d$ based on the geometric transformation $A_{s \leftarrow r}^{global}$ into the source image heat map $H_s$ from the reference probability distribution $H_r$, and the geometric transformation $A_{d \leftarrow r}^{global}$ into the target image heat map $H_d$ from the reference probability distribution $H_r$. The first global geometric transformation predictor 102 may calculate a global geometric transformation $A_{s \leftarrow d}^{global}$ into the source image $I_s$ from the target image $I_d$ through Equation 7 below.

$$A_{s \leftarrow d}^{global} = A_{s \leftarrow r}^{global} A_{d \leftarrow r}^{global-1} \quad \text{(Equation 7)}$$

Meanwhile, it has been described here that the neural network of the first global geometric transformation predictor 102 receives the source image $I_s$ and the target image $I_d$ to extract the source image heat map $H_s$ and the target image heat map $H_d$, respectively (that is, calculate the global geometric transformation based on the heat map), but the embodiment is not limited thereto, and a method of directly estimating the global geometric transformation from the source image $I_s$ and target image $I_d$ without a heatmap by using an artificial neural network such as an encoder-predictor structure may also be used.

The first local feature tensor predictor 104 may include an artificial neural network for estimating the local motion of the person in the speech synthesis image. In an exemplary embodiment, the artificial neural network may be trained to estimate a local speech motion of the person (motion related to speech, such as motions of the mouth and jaw of the person) from an input voice signal.

Specifically, the first local feature tensor predictor 104 may receive a target voice signal $M_d$. Here, the target voice signal $M_d$ may be a voice signal corresponding to a target image $I_d$. That is, when the target image $I_d$ is a video part in an image (that is, including video and audio) in which the person is speaking, the target voice signal $M_d$ may be an audio part of a section corresponding to the video part of the image in which the person is speaking.

The first local feature tensor predictor 104 may estimate a feature tensor for a local motion of the person from the target voice signal $M_d$. That is, the first local feature tensor predictor 104 may estimate a feature tensor (hereinafter referred to as a speech feature tensor) capable of expressing a local speech motion when the person utters a target voice, based on the target voice signal $M_d$.

The first local feature tensor predictor 104 may include an artificial neural network for estimating a speech feature tensor from the target voice signal $M_d$. The first local feature tensor predictor 104 may estimate a speech feature tensor $z_d$ from the target voice signal $M_d$ through Equation 8 below. The shape and size of the speech feature tensor $z_d$ may be appropriately set according to the degree required for controlling a speech action.

$$z_d = F^{local}(M_d) \quad \text{(Equation 8)}$$

$F^{local}$: Artificial neural network constituting the first local feature tensor predictor 104

Meanwhile, here, it has been described that the speech feature tensor is estimated by using only the target voice signal as an input, but the embodiment is not limited thereto, and the speech feature tensor may be estimated by using the source voice signal and the target voice signal as inputs.

The optical flow predictor 106 may calculate an optical flow representing a motion (or change amount) in units of pixels between the source image $I_s$ and the target image $I_d$ by using global geometric transformation calculated by the first global geometric transformation predictor 102 and the source image $I_s$ as inputs.

In an exemplary embodiment, when the first global geometric transformation predictor 102 calculates a global geometric transformation $A_{s \leftarrow d}^{global}$ into the source image $I_s$ from the target image $I_d$, the optical flow predictor 106 may calculate the optical flow from the target image $I_d$ to the source image $I_s$ based on the global geometric transformation $A_{s \leftarrow d}^{global}$ and the source image $I_s$, which will be described below. However, the embodiment is not limited thereto, and the optical flow from the source image $I_s$ to the target image $I_d$ may be calculated.

Specifically, the optical flow predictor 106 may transform the source image $I_s$ by applying the global geometric transformation $A_{s \leftarrow d}^{global}$ into the source image $I_s$ by using an image warping operator. In this case, the optical flow predictor 106 may transform the source image $I_s$ through Equation 9 below.

$$I_{s'} = \text{warp}(I_s, A_{s \leftarrow d}^{global}) \quad \text{(Equation 9)}$$

$I_{s'}$: Transformed source image $I_s$ warp ( ) Operator for image warping

In Equation 9, for the operator for image warping, a backward warping operation may be used that calculates coordinates of the source image $I_s$ corresponding to coordinates of the transformed source image $I_{s'}$ by applying each of global geometric transformations $A_{s \leftarrow d}^{global}$ to the coordinates of the transformed source image $I_{s'}$, and estimates pixel values of the transformed source image $I_{s'}$ from pixel values of the source image $I_s$ using interpolation.

The optical flow predictor 106 may calculate a weighted probability distribution map for estimating the optical flow based on the transformed source image $I_{s'}$. In this case, the optical flow predictor 106 may calculate a weighted probability distribution map P having two classes for each pixel by inputting the transformed source image $I_{s'}$ to the artificial neural network. This may be expressed by Equation 10 below.

$$P = F^{flow}(I_{s'}, I_s) \quad \text{(Equation 10)}$$

$F^{flow}$: Artificial neural network for estimating the optical flow in the optical flow predictor 106

Here, the artificial neural network may include a one-dimensional softmax layer at an output end to calculate the weighted probability distribution map P.

Meanwhile, here, the transformed source image $I_{s'}$ is used as an input to the artificial neural network $F^{flow}$, but the embodiment is not limited thereto and the weighted probability distribution map P may be calculated by using a feature tensor extracted from the source image $I_s$ as an input to the artificial neural network $F^{flow}$.

The optical flow predictor 106 may calculate the optical flow from the target image $I_d$ to the source image $I_s$ for each pixel by linearly combining the global geometric transformation $A_{ss \leftarrow d}^{global}$ and an identity geometric transformation $A_{s \leftarrow d}^{identity}$ by using a weighed probability distribution value corresponding to each of pixel positions of the transformed source image $I_{s'}$. Here, the identity geometric transformation may be a transformation in which both before and after transformation are identical, for example, a geometric transformation consisting of 0 for parallel translation, the identity matrix for rotation transformation, and 1 for scaling.

The optical flow predictor 106 may calculate the optical flow from the target image $I_d$ to the source image $I_s$ for each pixel through Equation 11.

$$f_{s \leftarrow d}(z) = P_0(z) A_{s \leftarrow d}^{global} + P_1(z) A_{s \leftarrow d}^{identity} \quad \text{(Equation 11)}$$

z: Pixel position $f_{s \leftarrow d}(z)$: Optical flow from target image $I_d$ to source image $I_s$ at a pixel z position P(z): Weighted probability distribution value of the pixel z position The image generator 108 may reconstruct and generate the target image $I_d$ based on the optical flow between the source image $I_s$ and the target image $I_d$ calculated by the optical flow predictor 106, the source image $I_s$, and the speech feature tensor $z_d$.

In an exemplary embodiment, when the optical flow predictor 106 calculates the optical flow $f_{s \leftarrow d}(z)$ from the target image $I_d$ to the source image $I_s$ for each pixel, the image generator 108 may reconstruct the target image $I_d$ based on the optical flow $f_{s \leftarrow d}(z)$ from the target image $I_d$ to the source image $I_s$ for each pixel, the source image $I_s$, and the speech feature tensor $z_d$.

Specifically, the image generator 108 may extract a feature tensor by inputting the source image $I_s$ into an artificial neural network (e.g., an encoder). In this case, the artificial neural network may encode the source image $I_s$ and extract a feature tensor from the source image $I_s$.

The image generator 108 may transform a feature tensor $\varphi(I_s)$ of the source image $I_s$ by using the optical flow $f_{s \leftarrow d}(z)$ from the target image $I_d$ to the source image $I_s$ for each pixel. The image generator 108 may transform the feature tensor $\varphi(I_s)$ of the source image $I_s$ through Equation 12 below.

$$\Phi(I_s)' = \text{warp}(\Phi(I_s), f_{s \leftarrow d})$$

Here, as the operator warp ( ) for image warping, a backward warping operator may be used.

The image generator 108 may reconstruct the target image $I_d$ by inputting a transformed feature tensor $\varphi(I_s)'$ of the source image to an artificial neural network (e.g., a decoder). The image generator 108 may learn the artificial neural network to minimize the difference between the reconstructed target image $I_d'$ and the actual target image $I_d$. The image generator 108 may generate a reconstructed target image $\hat{I}_d$ through Equation 13 below.

$$\hat{I}_d = F_{dec}^{generator}(\Phi(I_s)') \quad \text{(Equation 13)}$$

$F_{dec}^{generator}$: Artificial neural network constituting the decoder of the image generator 108

In this case, the image generator 108 may modulate the weight of the artificial neural network $F_{dec}^{generator}$ through Equations 14 and 15 below to control the local motion of the person with the speech feature tensor $z_d$.

That is, since the optical flow $f_{s \leftarrow d}(z)$ for each pixel is generated through the global geometric transformation of the person, the weight of the artificial neural network $F_{dec}^{generator}$ may be modulated using the speech feature tensor $z_d$ to reflect the local motion of the person when the target image is reconstructed.

$$s = fc(zd) \quad \text{(Equation 14)}$$

Fc( ): Fully-connected layer formed at the output terminal of $F_{dec}^{generator}$ s: Scale value estimated through the fully-connected layer from the speech feature tensor $z_d$ $$w' = \frac{s \cdot w}{\sigma(s \cdot w)} \quad \text{(Equation 15)}$$

w: Weight of $F_{dec}^{generator}$
w': Modulated weight of $F_{dec}^{generator}$
σ: Variance That is, the image generator 108 may modulate the weight w of the artificial neural network $F_{dec}^{generator}$ through a normalizing method through variance using a scale value estimated from the speech feature tensor $z_d$ through the fully-connected layer.

Meanwhile, here, it has been described that the optical flow predictor 106 calculates the optical flow $f_{s \leftarrow d}(z)$ for each pixel and the image generator 108 reconstructs the target image using the calculated flow, but the embodiment is not limited thereto, but without the process of calculating the optical flow for each pixel, the image generator 108 may receive the global geometric transformation $A_{s \leftarrow d}^{global}$, the source image $I_s$, and the speech feature tensor $z_d$ and reconstruct the target image based on the received ones.

Furthermore, here, it has been described that the local motion of the person is reflected by modulating the weight w of the artificial neural network $F_{dec}^{generator}$ using the speech feature tensor $z_d$, the embodiment is not limited thereto, and the local motion of the person may be reflected in the target image reconstructed using the speech feature tensor $z_d$ as the input to the artificial neural network $F_{dec}^{generator}$. That is, the target image may be reconstructed by inputting not only the transformed feature tensor $\varphi(I_s)'$ of the source image but also the speech feature tensor $z_d$ into the artificial neural network $F_{dec}^{generator}$.

Meanwhile, when the training of the speech synthesis image generating apparatus 100 is completed, an arbitrary target image may be reconstructed from the source image by inputting the source image and an arbitrary target image to the first global geometric transformation predictor 102, and inputting an arbitrary target voice signal into the first local feature tensor predictor 104.

According to the disclosed embodiment, the global motion and the local motion of a person in an image are separately estimated at the time of generating a speech synthesis image, thereby making it possible to reduce the overall volume of the machine learning model for generating a speech synthesis image and reduce the number of computations used therefor.

Figure 2:
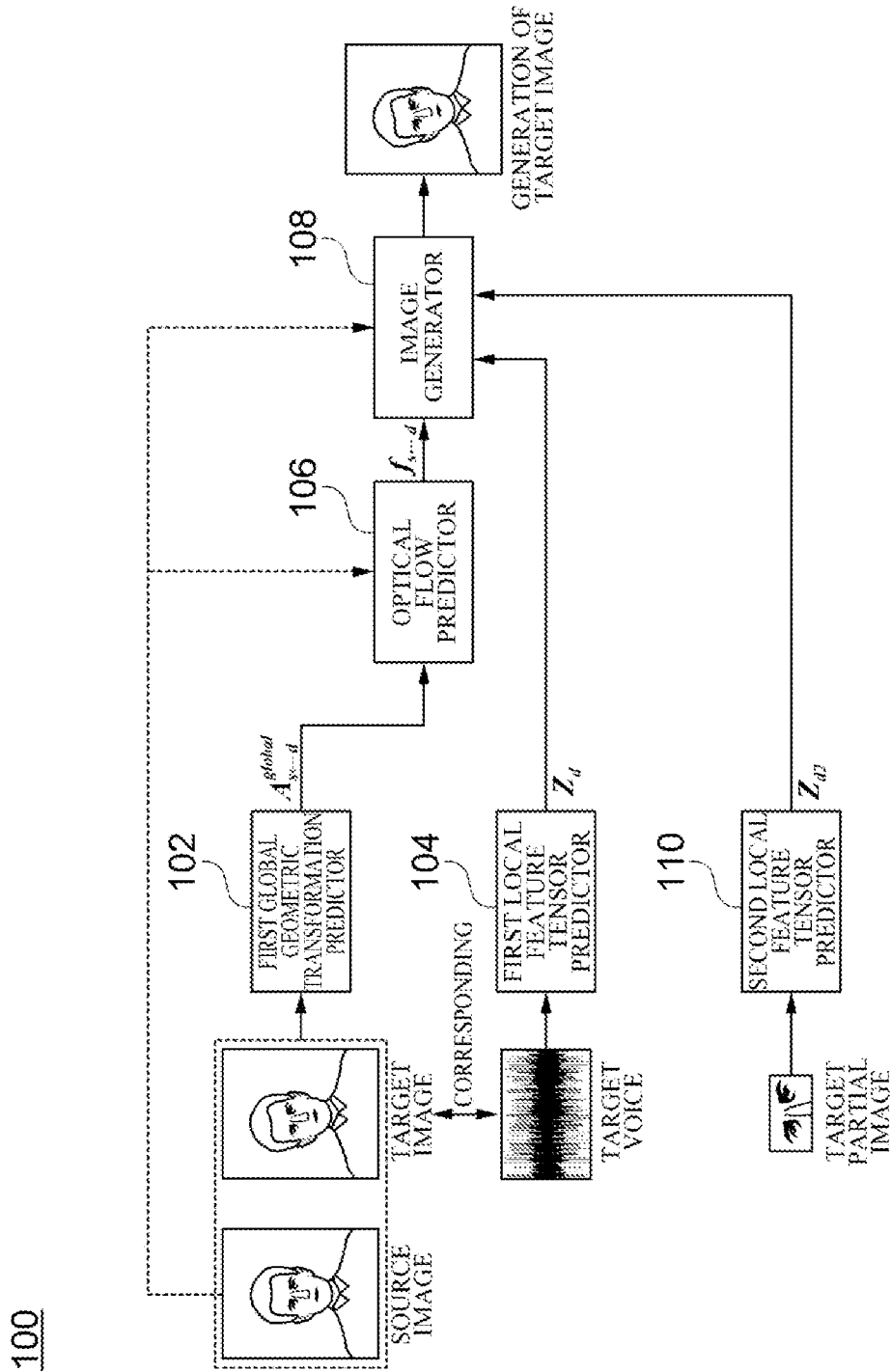
FIG. 2 is a block diagram showing a configuration of an apparatus for generating a speech synthesis image according to another embodiment of the present disclosure.

FIG. 2 is a block diagram showing a configuration of a speech synthesis image generating apparatus according to another embodiment of the present disclosure.

Referring to FIG. 2, the speech synthesis image generating apparatus 100 may include a first global geometric transformation predictor 102, a first local feature tensor predictor 104, an optical flow predictor 106, an image generator 108, and a second local feature tensor predictor 110.

That is, the speech synthesis image generating apparatus 100 illustrated in FIG. 2 may be an apparatus further including the second local feature tensor predictor 110 than in the embodiment illustrated in FIG. 1. Hereinafter, parts different from the embodiment shown in FIG. 1 will be mainly described.

Here, as described with reference to FIG. 1, the first local feature tensor predictor 104 may be provided to calculate a speech feature tensor for a local speech motion of a person from an input voice signal. That is, the first local feature tensor predictor 104 may be provided to calculate the speech feature tensor capable of expressing a difference in the local speech motion of a person between a source image and a target image based on an input target voice signal.

The second local feature tensor predictor 110 may include an artificial neural network for estimating the local non-speech motion of the person in the speech synthesis image. In an exemplary embodiment, the artificial neural network may be trained to estimate the local non-speech motion of the person (e.g., blinking of the eyes, eyebrow motion, frown, or the like of the person) from an input partial image (or feature point).

The second local feature tensor predictor 110 may receive a partial image including only a motion related to non-speech of the person. In an exemplary embodiment, the second local feature tensor predictor 110 may receive a target partial image $I_d^{eyes}$ including only the parts around the eyes and eyebrows of the person from the target image.

Here, the target partial image $I_d^{eyes}$ may be an image where a mask that covers parts of the target image except the parts around the eyes and eyebrows of the person in the target image is used, or an image in which only the parts around the eyes and eyebrows in the target image are picked up.

Meanwhile, here, it has been described that the target partial image $I_d^{eyes}$ is input to the second local feature tensor predictor 110, but the embodiment is not limited thereto, and a feature point of the target partial image $i_d^{eyes}$ may be input to the second local feature tensor predictor 110.

Meanwhile, here, it has been described that the target partial image $I_d^{eyes}$ is input to the second local feature tensor predictor 110, but the embodiment is not limited thereto, and the source partial image and the target partial image may be input to the second local feature tensor predictor 110. Here, the source partial image may be a partial image including only the parts around the eyes and eyebrows of the person in the source image.

When information corresponding to the global motion of the person is present in input data (partial image or feature point) including only motion related to non-speech of the person, the second local feature tensor predictor 110 may remove information corresponding to the global motion of the person from the input data. For example, when the input data is a partial image, the second local feature tensor predictor 110 may fix the position and size of a motion part related to non-speech of the person in the partial image and remove information corresponding to the global motion of the person. Further, when the input data is a feature point, the second local feature tensor predictor 110 may remove a value corresponding to the global motion of the person from feature point coordinates and leave only the motion value related to the non-speech of the person.

The second local feature tensor predictor 110 may estimate a non-speech feature tensor for a local non-speech motion of the person from the target partial image $I_d^{eyes}$. The second local feature tensor predictor 110 may estimate a non-speech feature tensor $z_{d2}$ from the target partial image $I_d^{eyes}$ through Equation 16 below.

$$z_{d2} = F^{local2}(I_d^{eyes}) \qquad \text{(Equation 16)}$$

$F^{local2}$: Artificial neural network constituting the second local feature tensor predictor 110

The optical flow predictor 106 may calculate an optical flow representing a motion (or change amount) in units of pixels between the source image $I_s$ and the target image $I_d$ by using a global geometric transformation calculated by the first global geometric transformation predictor 102 and the source image $I_s$ as inputs This is the same as the embodiment shown in FIG. 1, and thus a detailed description thereof will be omitted.

The image generator 108 may reconstruct and generate the target image $I_d$ based on the optical flow between the source image $I_s$ and the target image $I_d$ calculated by the optical flow predictor 106, the source image $I_s$, the speech feature tensor $z_d$, and the non-speech feature tensor $z_{d2}$.

The image generator 108 may transform the feature tensor $\varphi(I_s)$ of the source image $I_s$ by using the optical flow $f_{s \leftarrow d}(z)$ from the target image $I_d$ to the source image $I_s$ for each pixel, and may reconstruct the target image $I_d$ by inputting the transformed feature tensor $\varphi(I_s)'$ of the source image to the artificial neural network $F_{dec}^{generator}$ In this case, the image generator 108 may modulate the weight of the artificial neural network $F_{dec}^{generator}$ by using the speech feature tensor $z_d$ and the non-speech feature tensor $z_{d2}$. This may be done in the same manner as in Equations 14 and 15, and thus a detailed description thereof will be omitted.

Here, it has been described that both the first local feature tensor predictor 104 and the second local feature tensor predictor 110 are included, but the embodiment is not limited thereto, and when the non-speech feature tensor for the local non-speech motion is estimated, the first local feature tensor predictor 104 may be omitted. That is, the local non-speech motion may be synthesized regardless of the speech voice. For example, when synthesizing a standby image of the person without a voice, the local non-speech motion may be estimated without a speech voice.

Meanwhile, in the disclosed embodiment, the relative change amount of the global geometric transformation of the person may be learned using a voice signal sequence. That is, a separate artificial neural network that uses a voice signal sequence (sequential voice signal) as an input may be added, and the artificial neural network may be trained to estimate the relative change amount of the global geometric transformation calculated by the first global geometric transformation predictor 102 shown in FIG. 1 from the input voice signal sequence.

Figure 3:
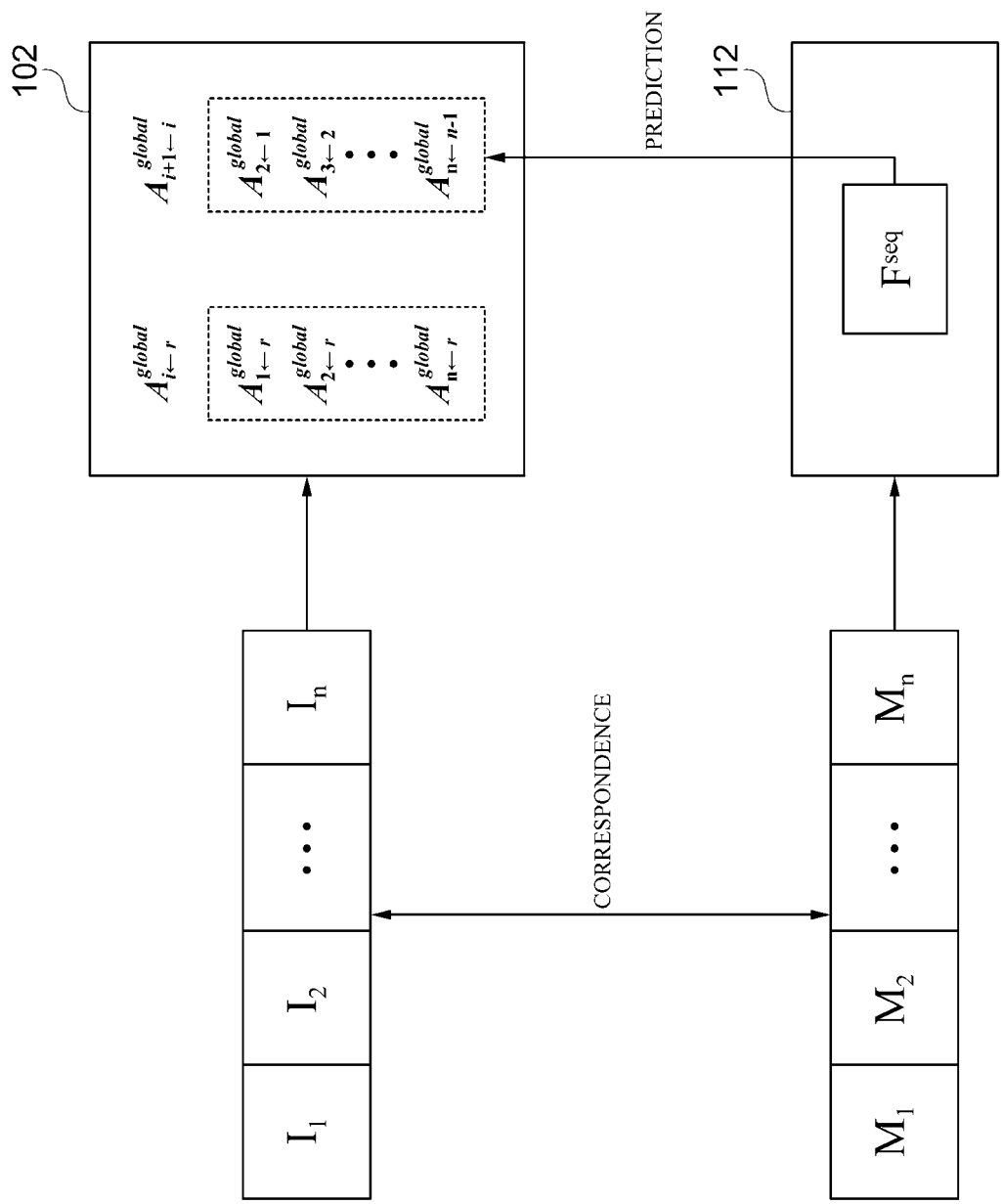
FIG. 3 is a diagram showing a configuration for estimating a global geometric transformation of a person from a sequential voice signal in an embodiment of the present disclosure.

FIG. 3 is a diagram showing a configuration for estimating a global geometric transformation of a person from a sequential voice signal in an embodiment of the present disclosure. Referring to FIG. 3, the speech synthesis image generating apparatus 100 may further include a second global geometric transformation predictor 112 in addition to the first global geometric transformation predictor 102.

Here, when the first global geometric transformation predictor 102 is in a trained state, and an image $I_i$, ($1 \leq i \leq n$) having n frames is input to the first global geometric transformation predictor 102, the first global geometric transformation predictor 102 may calculate a geometric transformation $A_{i \leftarrow r}^{global}$ into the i-th frame heat map from the preset reference probability distribution $H_r$.

In addition, the first global geometric transformation predictor 102 may calculate a global geometric transformation $A_{i+1 \leftarrow i}^{global}$ between two adjacent frames based on the geometric transformation $A_{i \leftarrow r}^{global}$ into the i-th frame heat map (i∈{1, . . . , n}) from the preset reference probability distribution $H_r$. Here, the first global geometric transformation predictor 102 may calculate the global geometric transformation $A_{i+1 \leftarrow i}^{global}$ between two frames through Equation 17 below.

$$A_{i+1 \leftarrow i}^{global} = A_{i+1 \leftarrow r}^{global} A_{i \leftarrow r}^{global-1} \qquad \text{(Equation 17)}$$

Meanwhile, in the training stage of the second global geometric transformation predictor 112, the second global geometric transformation predictor 112 may receive a sequential voice signal $M_i$ ($1 \leq i \leq n$) corresponding to an image $I_i$ ($1 \leq i \leq n$) having n frames. The second global geometric transformation predictor 112 may include an artificial neural network $F^{seq}$ that is trained to estimate the global geometric transformation $A_{i+1 \leftarrow i}^{global}$ between two frames of the corresponding image from the input sequential voice signal $M_i$.

In this case, the second global geometric transformation predictor 112 may use the global geometric transformation $A_{i+1 \leftarrow i}^{global}$ between two frames calculated by the first global geometric transformation predictor 102 as a correct answer value, and may train the artificial neural network $F^{seq}$ (that is, adjust the parameter or weight of the artificial neural network $F^{seq}$) to minimize the difference between the global geometric transformation between the two frames output from the artificial neural network $F^{seq}$ and the correct answer value.

The second global geometric transformation predictor 112 may estimate the global geometric transformation $A_{i+1 \leftarrow i}^{global}$ between two frames of the corresponding image from the input sequential voice signal $M_i$ through Equation 18 below.

$$\{A_{2 \leftarrow 1}^{global}, A_{3 \leftarrow 2}^{global}, \ldots, A_{n \leftarrow n-1}^{global}\} = F^{seq}(\{M_1, M_2, \ldots, M_n\}) \quad \text{(Equation 18)}$$

Figure 4:
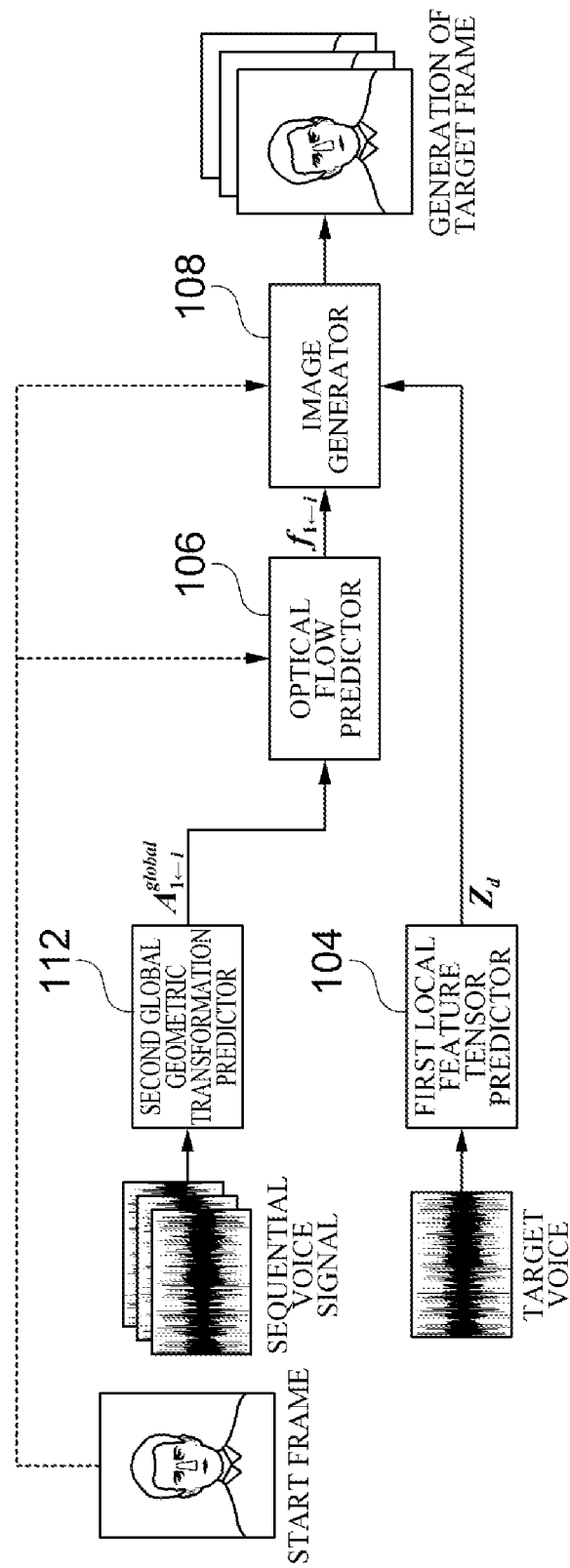
FIG. 4 is a block diagram showing a configuration of an apparatus for generating a speech synthesis image according to yet another embodiment of the present disclosure.

As described above, when the training of the second global geometric transformation predictor 112 is completed, the global geometric transformation of the person may be predicted using the source image and the sequential voice signal as inputs. In this case, the global geometric transformation of the person is predicted through the second global geometric transformation predictor 112 instead of the first global geometric transformation predictor 102. The configuration of a speech synthesis image generating apparatus 100 for achieving the above is shown in FIG. 4. That is, FIG. 4 is a block diagram showing a configuration of a speech synthesis image generating apparatus according to yet another embodiment of the present disclosure.

Referring to FIG. 4, a speech synthesis image generating apparatus 100 may include a second global geometric transformation predictor 112, a first local feature tensor predictor 104, an optical flow predictor 106, and an image generator 108. Here, each of artificial neural networks of the speech synthesis image generating apparatus 100 is in a state in which training is completed, and a test process for generating a speech synthesis image through input data will be described.

The second global geometric transformation predictor 112 may receive a sequential voice signal of a predetermined person, and estimate a global geometric transformation $A_{i+1 \leftarrow i}^{global}$ between two frames of an image corresponding to the sequential voice signal from the received sequential voice signal.

The second global geometric transformation predictor 112 may calculate a global geometric transformation into a start frame (source image) from a target frame (i-th frame) based on the global geometric transformation $A_{i+1 \leftarrow i}^{global}$ between two frames of the image corresponding to the sequential voice signal.

Here, the start frame may be for providing information about the identity of the person. In this case, in order to provide information about the identity of the person, an embedding vector or the like for the person may be additionally input instead of the start frame or in addition to the start frame.

Specifically, the second global geometric transformation predictor 112 may calculate a global geometric transformation $A_{i \leftarrow 1}^{global}$ into the i-th frame (that is, target frame) from the start frame through Equation 19 below by using the source image as the start frame based on the global geometric transformation $A_{i+1 \leftarrow i}^{global}$ between two frames of the image corresponding to the sequential voice signal.

$$A_{i \leftarrow 1}^{global} = \prod_{j=1}^{i-1} A_{j+1 \leftarrow j}^{global} \quad \text{(Equation 19)}$$

Next, the second global geometric transformation predictor 112 may calculate the global geometric transformation $A_{1 \leftarrow i}^{global}$ into the start frame from the i-th frame, which is the target frame, through Equation 20 below.

$$A_{1 \leftarrow i}^{global} = A_{i \leftarrow 1}^{global-1} \quad \text{(Equation 20)}$$

The first local feature tensor predictor 104 receives a target voice signal. Here, the target voice signal may be a voice signal corresponding to the target frame (i-th frame). The first local feature tensor predictor 104 may estimate the speech feature tensor $z_d$ for the local motion of the person from the target voice signal.

The optical flow predictor 106 may receive the start frame and the global geometric transformation $A_{1 \leftarrow i}^{global}$ into the start frame from the i-th target frame, which is the target frame, and calculate an optical flow $f_{1 \leftarrow i}$ from the target frame to the start frame for each pixel from the received ones.

The image generator 108 may receive each of the start frame, the speech feature tensor $z_d$, and the optical flow $f_{1 \leftarrow i}$ from the target frame to the start frame for each pixel, and reconstruct and generate the target frame therefrom.

As described above, according to the disclosed embodiment, it is possible to estimate the global motion of the person by using the sequential voice signal as an input, and to generate a speech synthesis image based on the estimation.

Meanwhile, here, the first local feature tensor predictor 104 is illustrated to estimate the local speech motion of the person, but the embodiment is not limited thereto, and the second local feature tensor predictor 110 may be added to additionally estimate the local non-speech motion of the person.

Figure 5:
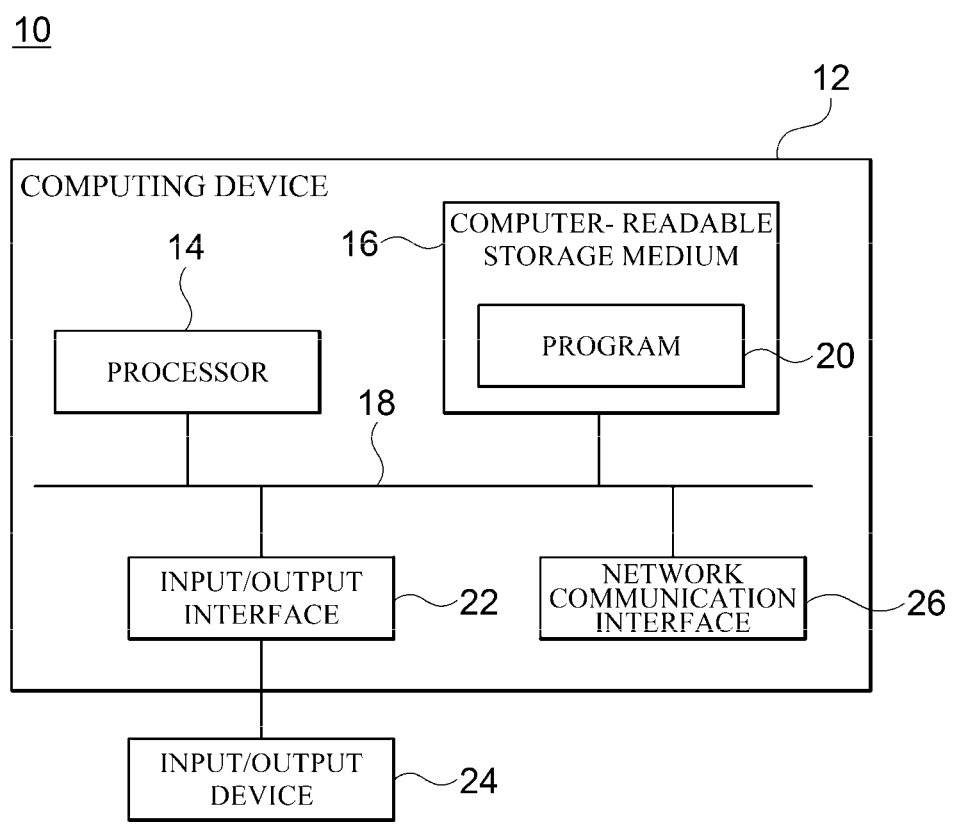
FIG. 5 is a block diagram exemplarily illustrating a computing environment that includes a computing device suitable for use in exemplary embodiments.

FIG. 5 is a block diagram exemplarily illustrating a computing environment 10 that includes a computing device suitable for use in exemplary embodiments. In the illustrated embodiment, each component may have different functions and capabilities in addition to those described below, and additional components may be included in addition to those described below.

The illustrated computing environment 10 includes a computing device 12. In an embodiment, the computing device 12 may be the speech synthesis image generating apparatus 100.

The computing device 12 includes at least one processor 14, a computer-readable storage medium 16, and a communication bus 18. The processor 14 may cause the computing device 12 to operate according to the above-described exemplary embodiments. For example, the processor 14 may execute one or more programs stored in the computer-readable storage medium 16. The one or more programs may include one or more computer-executable instructions, which may be configured to cause, when executed by the processor 14, the computing device 12 to perform operations according to the exemplary embodiments.

The computer-readable storage medium 16 is configured to store computer-executable instructions or program codes, program data, and/or other suitable forms of information. A program 20 stored in the computer-readable storage medium 16 includes a set of instructions executable by the processor 14. In an embodiment, the computer-readable storage medium 16 may be a memory (a volatile memory such as a random-access memory, a non-volatile memory, or any suitable combination thereof), one or more magnetic disk storage devices, optical disc storage devices, flash memory devices, other types of storage media that are accessible by the computing device 12 and may store desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 via the input/output interface 22. The exemplary input/output device 24 may include a pointing device (a mouse, a trackpad, or the like), a keyboard, a touch input device (a touch pad, a touch screen, or the like), a voice or sound input device, input devices such as various types of sensor devices and/or imaging devices, and/or output devices such as a display device, a printer, an interlocutor, and/or a network card. The exemplary input/output device 24 may be included inside the computing device 12 as a component constituting the computing device 12, or may be connected to the computing device 12 as a separate device distinct from the computing device 12.

Although the representative embodiments of the present disclosure have been described in detail as above, those skilled in the art will understand that various modifications may be made thereto without departing from the scope of the present disclosure. Therefore, the scope of rights of the present disclosure should not be limited to the described embodiments, but should be defined not only by the claims set forth below but also by equivalents of the claims.

What is claimed is:

1. An apparatus for generating a speech synthesis image based on machine learning, the apparatus comprising:
at least one processor configured to implement:
a first global geometric transformation predictor configured to be trained to receive each of a source image and a target image including the same person, and predict a global geometric transformation for a global motion of the person between the source image and the target image, based on the source image and the target image;
a local feature tensor predictor configured to be trained to predict a feature tensor for a local motion of the person, based on preset input data; and
an image generator configured to be trained to reconstruct the target image, based on the global geometric transformation, the source image, and the feature tensor for the local motion-,
wherein the local feature tensor predictor includes a first local feature tensor predictor configured to be trained to predict a speech feature tensor for a local speech motion of the person, based on a preset voice signal, and
the local speech motion is a motion related to speech of the person.

2. The apparatus of claim 1, wherein the global motion is a motion of the person with an amount greater than or equal to a preset threshold amount of motion, and
the local motion is a motion of a face when the person is speaking.

3. The apparatus of claim 2, wherein the first global geometric transformation predictor is further configured to extract a geometric transformation into a source image heat map from a preset reference probability distribution, based on the source image, extract a geometric transformation into a target image heat map from the preset reference probability distribution, based on the target image, and calculate the global geometric transformation, based on the geometric transformation into the source image heat map from the reference probability distribution and the geometric transformation into the target image heat map from the reference probability distribution.

4. The apparatus of claim 3, wherein the source image heat map is a probability distribution map in an image space as to whether each pixel in the source image is a pixel related to the global motion of the person, and
the target image heat map is a probability distribution map in the image space as to whether each pixel in the target image is a pixel related to the global motion of the person.

5. The apparatus of claim 2, wherein the local feature tensor predictor further includes a second local feature tensor predictor configured to be trained to predict a non-speech feature tensor for a local non-speech motion of the person, based on preset input data, and
the local non-speech motion is a motion not related to speech of the person.

6. The apparatus of claim 5, wherein the second local feature tensor predictor is trained to receive a target partial image including only a motion not related to speech of the person in the target image, and predict the non-speech feature tensor, based on the target partial image.

7. The apparatus of claim 2, further comprising an optical flow predictor configured to be trained to calculate an optical flow between the source image and the target image, based on the source image and the global geometric transformation,
wherein the image generator is trained to reconstruct the target image, based on the optical flow between the source image and the target image, the source image, and the feature tensor for the local motion.

8. The apparatus of claim 1, wherein the first global geometric transformation predictor is further configured to calculate a geometric transformation into any i-th (i∈{1, 2, . . . , n}) (n is a natural number equal to or greater than 2) frame heat map in an image having n frames from a preset reference probability distribution when the image is input, and calculate a global geometric transformation between two adjacent frames in the image, based on the geometric transformation into the i-th frame heat map from the reference probability distribution.

9. The apparatus of claim 8, further comprising a second global geometric transformation predictor configured to receive sequential voice signals corresponding to the n frames, and to be trained to predict a global geometric transformation between two adjacent frames in the image from the sequential voice signals.

10. The apparatus of claim 9, wherein the second global geometric transformation predictor is further configured to adjust a parameter of an artificial neural network to minimize a difference between the global geometric transformation between the two adjacent frames which is predicted in the second global geometric transformation predictor and the global geometric transformation between the two adjacent frames which is calculated in the first global geometric transformation predictor.

11. The apparatus of claim 10, wherein in a test process for speech synthesis image generation,
the second global geometric transformation predictor is further configured to receive sequential voice signals of a person, calculate a global geometric transformation between two adjacent frames in an image corresponding to the sequential voice signals from the sequential voice signals, and calculate a global geometric transformation between a preset target frame and a preset start frame, based on the global geometric transformation between the two adjacent frames, the local feature tensor predictor is further configured to predict a feature tensor for a local motion of the person, based on preset input data, and the image generator is further configured to reconstruct the target frame, based on the global geometric transformation, the source image, and the feature tensor for the local motion.

12. A method for generating a speech synthesis image, based on machine learning that is performed in a computing device including one or more processors and a memory storing one or more programs executed by the one or more processors, the method comprising:

training a first global geometric transformation predictor to receive each of a source image and a target image including the same person, and predict a global geometric transformation for a global motion of the person between the source image and the target image, based on the source image and the target image;

training a local feature tensor predictor to predict a feature tensor for a local motion of the person, based on preset input data; and training an image generator to reconstruct the target image, based on the global geometric transformation, the source image, and the feature tensor for the local motion, wherein the local feature tensor predictor includes a first local feature tensor predictor configured to be trained to predict a speech feature tensor for a local speech motion of the person, based on a preset voice signal, and the local speech motion is a motion related to speech of the person.

* * * * *